United States Patent
Be'ery et al.

(10) Patent No.: US 11,539,510 B2
(45) Date of Patent: Dec. 27, 2022

(54) SYSTEM AND METHOD OF CRYPTOGRAPHIC KEY MANAGEMENT IN A PLURALITY OF BLOCKCHAIN BASED COMPUTER NETWORKS

(71) Applicant: KZEN NETWORKS LTD, Tel Aviv (IL)

(72) Inventors: Tal Arieh Be'ery, Petach Tikva (IL); Ouriel Ohayon, Tel Aviv (IL); Omer Shlomovits, Petach Tikva (IL); Gary Benattar, Netanya (IL)

(73) Assignee: ZENGO LTD, Tel Aviv (IL)

( * ) Notice: Subject to any disclaimer, the term of this patent is extended or adjusted under 35 U.S.C. 154(b) by 0 days.

(21) Appl. No.: 17/632,313

(22) PCT Filed: Aug. 2, 2020

(86) PCT No.: PCT/IL2020/050846
§ 371 (c)(1),
(2) Date: Feb. 2, 2022

(87) PCT Pub. No.: WO2021/024250
PCT Pub. Date: Feb. 11, 2021

(65) Prior Publication Data
US 2022/0303122 A1    Sep. 22, 2022

Related U.S. Application Data

(60) Provisional application No. 62/882,049, filed on Aug. 2, 2019.

(51) Int. Cl.
*H04L 9/08*    (2006.01)
*H04L 9/40*    (2022.01)
*H04L 9/00*    (2022.01)

(52) U.S. Cl.
CPC .............. *H04L 9/0819* (2013.01); *H04L 9/50* (2022.05); *H04L 63/061* (2013.01); *H04L 2209/56* (2013.01)

(58) Field of Classification Search
CPC ....... H04L 9/0819; H04L 9/50; H04L 63/061; H04L 2209/56
See application file for complete search history.

(56) References Cited

U.S. PATENT DOCUMENTS 10,411,897 B2 *   9/2019   Paolini-Subramanya ................... H04L 63/123
11,296,889 B2 *   4/2022   Snow ....................... G06F 21/64
(Continued)

FOREIGN PATENT DOCUMENTS

CA    3009731    8/2017

OTHER PUBLICATIONS

Ziegeldorf et al., "Secure and Anonymous Decentralized Bitcoin Mixing", Future Generation Computer Systems 80 (2018): 448-466, RWTH Aachen University, Ahornstrasse 55, 52074 Aachen, Germany.
(Continued)

*Primary Examiner* — Taghi T Arani
*Assistant Examiner* — Blake I Narramore
(74) *Attorney, Agent, or Firm* — Pearl Cohen Zedek Latzer Baratz LLP

(57) ABSTRACT

Systems and methods of cryptographic key distribution in a plurality of networks, including: sharing, by a first device, a first portion of a first cryptographic key controlled by a server with a second device, sharing, by the second device, a first portion of a second cryptographic key with the first device, signing a first transaction on a first network with data exchange from a first threshold signature address controlled by the first device, to a third address when one or more
(Continued)

details of the first transaction are validated by the server; and signing a second transaction on a second network with data exchange from the second threshold signature address controlled by the second device to a fourth address when one or more details of the second transaction are validated by the server.

20 Claims, 12 Drawing Sheets

(56) References Cited

U.S. PATENT DOCUMENTS

| | | | | |
|---|---|---|---|---|
| 2017/0132617 | A1* | 5/2017 | D'Souza | H04L 9/3226 |
| 2018/0026796 | A1* | 1/2018 | Oberheide | H04L 9/3226 |
| | | | | 713/176 |
| 2019/0065764 | A1* | 2/2019 | Wood | H04L 9/0637 |
| 2019/0068591 | A1* | 2/2019 | Zhang | H04L 63/0869 |
| 2019/0156301 | A1 | 5/2019 | Bentov et al. | |
| 2019/0207748 | A1* | 7/2019 | Courtney | H04L 9/30 |
| 2019/0354969 | A1* | 11/2019 | Spector | G06Q 20/10 |
| 2019/0356481 | A1* | 11/2019 | Spector | G06Q 20/3829 |
| 2019/0356674 | A1* | 11/2019 | Irazabal | H04L 63/12 |

OTHER PUBLICATIONS

Stathakopoulou et al., "Threshold signatures for blockchain systems", Swiss Federal Institute of Technology (2017), IBM Research, Switzerland.

Goldfeder et al., "Securing Bitcoin wallets via a new DSA/ECDSA threshold signature scheme", Jun. 2015.

International Search Report for PCT application No. PCT/IL2020/050846, dated Sep. 17, 2020.

European Search Report for EP application No. EP20850898.6, dated Jul. 14, 2022.

* cited by examiner

Generating a fifth threshold signature address 'A3' on the first computer network 'A', wherein a combination of a first portion of a fifth cryptographic key 'A3C1' controlled by the first computing device 'C1' with a second portion of the fifth cryptographic key 'A3C2' controlled by the second computing device 'C2' and with a third portion of the fifth cryptographic key 'A3S' controlled by the server corresponds to the fifth threshold signature address 'A3'

—411

Generating a sixth threshold signature address 'B3' on the second computer network 'B', wherein a combination of a first portion of a sixth cryptographic key 'B3C2' controlled by the second computing device 'C2' with a second portion of the sixth cryptographic key 'B3C1' controlled by the first computing device 'C1' and with a third portion of the sixth cryptographic key 'B3S' controlled by the server corresponds to the sixth threshold signature address 'B2'

SYSTEM AND METHOD OF CRYPTOGRAPHIC KEY MANAGEMENT IN A PLURALITY OF BLOCKCHAIN BASED COMPUTER NETWORKS

CROSS-REFERENCE TO RELATED APPLICATIONS

This application is a National Phase Application of PCT International Application No. PCT/IL2020/050846, International Filing Date Aug. 2, 2020, claiming the benefit of U.S. Provisional Patent Application No. 62/882,049, filed Aug. 2, 2019, which are hereby incorporated by reference.

FIELD OF THE INVENTION

The present invention relates to blockchain based computer networks. More particularly, the present invention relates to systems and methods for cryptographic key distribution in a plurality of blockchain based computer networks.

BACKGROUND OF THE INVENTION

Many blockchain based computer networks are available now with their own tokens or cryptocurrencies (for example 'Ethereum' and 'Bitcoin'). Such blockchain based networks usually have a list or ledger of data records (or blocks) that are linked using cryptography. Each block can contain a cryptographic hash of the previous block, a time stamp of each recorded action, etc. Currently, users that want to directly exchange these tokens or cryptocurrencies (e.g., without exchanging cryptocurrencies to an intermediate currency such as fiat) usually exchange between them, by trading an amount 'X' of a token from a first blockchain network (e.g., 'Ethereum') for an amount 'Y' of a token from a second blockchain network (e.g., 'Bitcoin') where the parties send the amount to each other's addresses (e.g., identifiers with alphanumeric characters) that represent destination on the respective blockchain for the trade. Generally, a blockchain token is a unit of value intended to be part in the ecosystem of the blockchain platform.

Alternatively, the parties can exchange cryptographic keys (e.g., a key may be a string of data used to lock or unlock cryptographic functions) that control the addresses and effectively transfer the ownership of the tokens. However, in both methods, the first party that exchanges (e.g., funds or cryptographic keys) takes a risk that the second party may not complete the transaction. In other words, the problem is that the transaction is not concurrent (also referred to herein as "atomic") by all parties as it includes several individual transactions and therefore can potentially only partially succeed (or be only partially executed) if at least one party does not fulfill its part. Hence, this problem is also known as the "atomic swap" problem.

Traditionally, this problem can be addressed by introducing a trusted third party that holds the goods (e.g., the tokens or cryptographic keys) in an escrow and enforces the protocol fairness by releasing the exchanged goods only when both parties had carried out the transactions. However, finding such trusted party can be difficult and costly, as the trusted third party fully controls the goods and can spend or otherwise keep or dispose of them if it becomes rogue.

Various exchanges can be used for exchanging different coins over the same blockchain (e.g., exchanging ERC20 tokens over the 'Ethereum' blockchain) and enforcing the trade fairness, either by using centralized exchanges (as a trusted entity) or by decentralized exchanges where smart contracts, e.g. trackable computer protocols intended to digitally facilitate, verify, or enforce the performance of a contract, without third parties, can enforce the fairness of the exchange.

Currently, some possible ways for exchanging tokens or cryptocurrencies from different blockchain networks requires trust in a centralized entity, such as an escrow or a central exchange. There are some approaches that suggest replacing this trust with a third party, for instance using a Trusted Execution Environment (TEE) implemented in hardware and/or software, or using smart contracts to enforce the fairness of the transaction, but they require support of the necessary functionality from all relevant blockchain networks.

In typical classic blockchain software implementations, a client locally generates a private key and a corresponding public key. The public key can be used to create an address and/or the messages to be signed can be transactions of value between such addresses (or accounts). Verification of transaction validity can be done publicly by the blockchain maintainers using the relevant addresses' public keys, while the key generation can be done locally using the client's secret key. It should be noted that the local data is not public, and therefore key generation carried out locally may not be accessible by other parties as with public key generation. In order to achieve a distributed signing for blockchain algorithms, it may be required to change the key generation algorithm (i.e., generating a private-public keypair) and/or signing protocols without affecting the public verification protocol. This may be achieved for instance by validating a signature on a message using the public key.

Distributed key generation protocols can involve two main parts: a local secret data being generated (similar to the original centralized key generation protocol) by each of the parties, and communication between the participating parties to provide the necessary view to all other parties to compute the composed public key (and resulting address), and to later generate the signatures. Distributed signing occurs only after the key generation and usually involves an interactive protocol for each party: receiving a message to sign, and applying local computation on the message using local data previously generated on the key generation protocol to distribute the results and compute a signature locally. Splitting of the signing functionality (such that several parties are involved in each signature) can be currently considered as best practice for security and is implemented in some of the blockchain networks, as the "multi-signature" extension, in which multiple signers are explicitly assigned with multiple distinct keys by a dedicated signature algorithm.

There is therefore a need for enabling simple exchange without the requirement of integrating special environments (e.g., TEE or smart contract functionality) into the blockchain networks.

SUMMARY

There is thus provided, in accordance with some embodiments of the invention, a method of cryptographic key distribution in a plurality of computer networks, with a server in communication with the plurality of computer networks, wherein a first computing device controls a first threshold signature address on a first computer network with a first portion of a first cryptographic key in combination, with a second portion of the first cryptographic key controlled by the server, wherein a second computing device controls a second threshold signature address on a second computer network, with a first portion of a second cryptographic key in combination with a second portion of the second cryptographic key, controlled by the server, the method including: sharing, by the first computing device, the first portion of the first cryptographic key with the second computing device, sharing, by the second computing device, the first portion of the second cryptographic key with the first computing device, signing a first transaction on the first computer network with data exchange from the first threshold signature address to a third address when one or more details of the first transaction are validated by the server, and signing a second transaction on the second computer network with data exchange from the second threshold signature address to a fourth address when one or more details of the second transaction are validated by the server, wherein validation by the server includes validating that the transaction is carried out by the computing device controlling the corresponding address.

In some embodiments, the second computing device generates the third address on the first computer network, wherein a combination of a first portion of a third cryptographic key controlled by the second computing device with a second portion of the third cryptographic key controlled by the server corresponds to the third address, wherein signing the first transaction on the first computer network with data exchange between the first threshold signature address and the third address, includes: signing the first transaction, by the second computing device, using the first portion of the first cryptographic key corresponding to the first threshold signature address, and signing the first transaction, by the server, using the second portion of the first cryptographic key.

In some embodiments, the first computing device generates the fourth address on the second computer network, wherein a combination of a first portion of a fourth cryptographic key controlled by the first computing device with a second portion of the fourth cryptographic key controlled by the server corresponds to the fourth address, and wherein signing the second transaction on the second computer network with data exchange between the second threshold signature address and the fourth address, includes: signing the second transaction, by the first computing device, using the first portion of the second cryptographic key corresponding to the second threshold signature address, and signing the second transaction, by the server, using the second portion of the second cryptographic key.

In some embodiments, at least one of the third address and the fourth address is a threshold signature address. In some embodiments, signing the first transaction further includes: signing the first transaction, by the second computing device, using the first portion of the first cryptographic key corresponding to the first threshold signature address, and signing the first transaction, by the server, using the second portion of the first cryptographic key. In some embodiments, signing the second transaction further includes: signing the second transaction, by the first computing device, using the first portion of the second cryptographic key corresponding to the second threshold signature address, and signing the second transaction, by the server, using the second portion of the second cryptographic key.

In some embodiments, the first computing device shares a public key corresponding to the first threshold signature address, with the second computing device and the server, and the second computing device shares a public key corresponding to the second threshold signature address, with the first computing device and the server. In some embodiments, at least one of the first threshold signature address and the second threshold signature address is encrypted by the corresponding public key. In some embodiments, the one or more details of the first transaction are validated by the server with the shared public key corresponding to the first threshold signature address, and wherein the one or more details of the second transaction are validated by the server with the shared public key corresponding to the second threshold signature address.

In some embodiments, the exchanged data includes at least one unit of cryptographic currency. In some embodiments, the server publishes the first transaction in the first computer network and the second transaction in the second computer network. In some embodiments, the first computing device and the second computing device communicate via the server. In some embodiments, at least one of the first computing device and the second computing device sends a share exchange command to the server. In some embodiments, the server signs the first transaction with at least a portion of the first cryptographic key, and the server signs the second transaction with at least a portion of the second cryptographic key.

There is thus provided, in accordance with some embodiments of the invention, a method of cryptographic key distribution in a plurality of computer networks, with a server in communication with the plurality of computer networks, wherein a first computing device controls a first threshold signature address on a first computer network with a first portion of a first cryptographic key in combination, with a second portion of the first cryptographic key controlled by the server, wherein a second computing device controls a second threshold signature address on a second computer network, with a first portion of a second cryptographic key in combination with a second portion of the second cryptographic key, controlled by the server, the method including: generating, by the first computing device, a fifth threshold signature address on the first computer network, wherein a combination of a first portion of a fifth cryptographic key controlled by the first computing device with a second portion of the fifth cryptographic key controlled by the second computing device and with a third portion of the fifth cryptographic key controlled by the server corresponds to the fifth threshold signature address, generating, by the second computing device, a sixth threshold signature address on the second computer network, wherein a combination of a first portion of a sixth cryptographic key controlled by the second computing device with a second portion of the sixth cryptographic key controlled by the first computing device and with a third portion of the sixth cryptographic key controlled by the server corresponds to the sixth threshold signature address, signing a third transaction on the first computer network with data exchange between the first threshold signature address and the fifth threshold signature address when the one or more details of the third transaction are validated by the server, including: signing the third transaction, by the first computing device, using the first portion of the first cryptographic key corresponding to the first threshold signature address, and signing the third transaction, by the server, using the second portion of the first cryptographic key, signing a fourth transaction on the second computer network with data exchange between the second threshold signature address and the sixth threshold signature address when the one or more details of the fourth transaction are validated by the server, including: signing the fourth transaction, by the second computing device, using the first portion of the second cryptographic key corresponding to the second threshold signature address, and signing the fourth transaction, by the server, using the second portion of the second cryptographic key, sharing, by the first computing device, the first portion of the fifth cryptographic key with the second computing device, when the one or more details of the third transaction are validated by the server, and sharing, by the second computing device, the first portion of the sixth cryptographic key with the first computing device, when the one or more details of the fourth transaction are validated by the server.

In some embodiments, the at least a portion of a fifth cryptographic key and the at least a portion of a sixth cryptographic key are encrypted in accordance with an incremental cryptographic share exchange protocol configured to decrypt shares of cryptographic keys by multiple parties. In some embodiments, the second computing device generates at least one seventh threshold signature address on the first computer network that is controlled by the second computing device and the server, and a fifth transaction is signed on the first computer network with data exchange between the fifth threshold signature address and the seventh threshold signature address, including: signing the fifth transaction, by the second computing device, using the first portion of the fifth cryptographic key and the second portion of the fifth cryptographic key, corresponding to the fifth threshold signature address, and signing the fifth transaction, by the server, using the third portion of the seventh cryptographic key, when the one or more details of the fifth transaction are validated by the server.

In some embodiments, the first computing device generates at least one eighth threshold signature address on the second computer network that is controlled by the first computing device and the server, and a sixth transaction is signed on the second computer network with data exchange between the sixth threshold signature address and the eighth threshold signature address, including: signing the sixth transaction, by the first computing device, using the first portion of the sixth cryptographic key and the second portion of the sixth cryptographic key, corresponding to the eighth threshold signature address, and signing the sixth transaction, by the server, using the third portion of the sixth cryptographic key, when the one or more details of the sixth transaction are validated by the server.

In some embodiments, the first computing device shares a public key corresponding to the fifth threshold signature address, with the second computing device and the server, and the second computing device shares a public key corresponding to the sixth threshold signature address, with the first computing device and the server. In some embodiments, at least one of the fifth threshold signature address and the sixth threshold signature address is encrypted by the corresponding public key. In some embodiments, the one or more details of the third transaction are validated by the server with the shared public key corresponding to the fifth threshold signature address, and wherein the one or more details of the fourth transaction are validated by the server with the shared public key corresponding to the sixth threshold signature address.

In some embodiments, the exchanged data includes at least one unit of cryptographic currency. In some embodiments, the server publishes the third transaction in the first computer network and the fourth transaction in the second computer network. In some embodiments, the server signs the third transaction with at least a portion of the fifth cryptographic key, and the server signs the fourth transaction with at least a portion of the sixth cryptographic key.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 4B-4E show a flowchart of another method of cryptographic key distribution in a plurality of computer networks, according to some embodiments of the invention.

Figure 1:
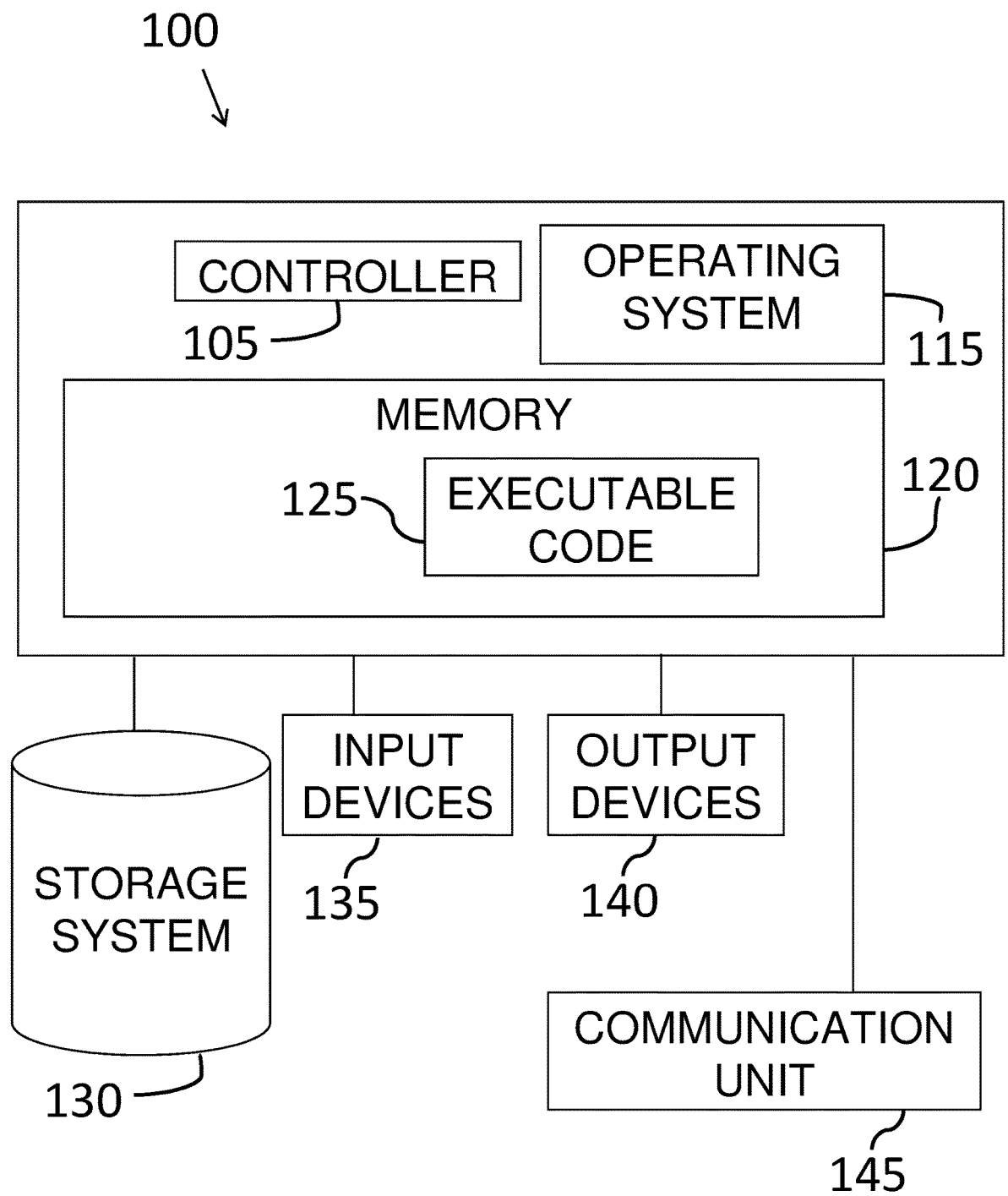
FIG. 1 shows a block diagram of an exemplary computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Reference is made to FIG. 1, which is a schematic block diagram of an example computing device, according to some embodiments of the invention. Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet. Controller 105 may be configured to execute program code to perform operations described herein. The system described herein may include one or more computing device(s) 100, for example, to act as the various devices or the components shown in FIG. 2A. For example, system 200 may be, or may include computing device 100 or components thereof.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be a software application that performs methods as further described herein. Although, for the sake of clarity, a single item of executable code 125 is shown in FIG. 1, a system according to embodiments of the invention may include a plurality of executable code segments similar to executable code 125 that may be stored into memory 120 and cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices. Any suitable number of output devices 140 may be operatively connected to computing device 100. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices. For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more facility computing device 100 and one or more remote server computers in active communication with one or more facility computing device 100 such as computing device 100, and in active communication with one or more portable or mobile devices such as smartphones, tablets and the like.

According to some embodiments, systems and methods for cryptographic key distribution are provided hereinafter, whereby users that are in possession of cryptocurrencies of different blockchain based networks (e.g., using different protocols such as in 'Bitcoin' and 'Ethereum') are able to easily exchange them without the need for an intermediate third party, while maintaining fairness of the process. Such process may be based on an interactive confidential share exchange protocol for two party threshold signature clients, allowing them to exchange shares controlling a threshold signatures address in an incremental, confidential yet verifiable manner (e.g., sending a bit for any received bit).

Figure 2A:
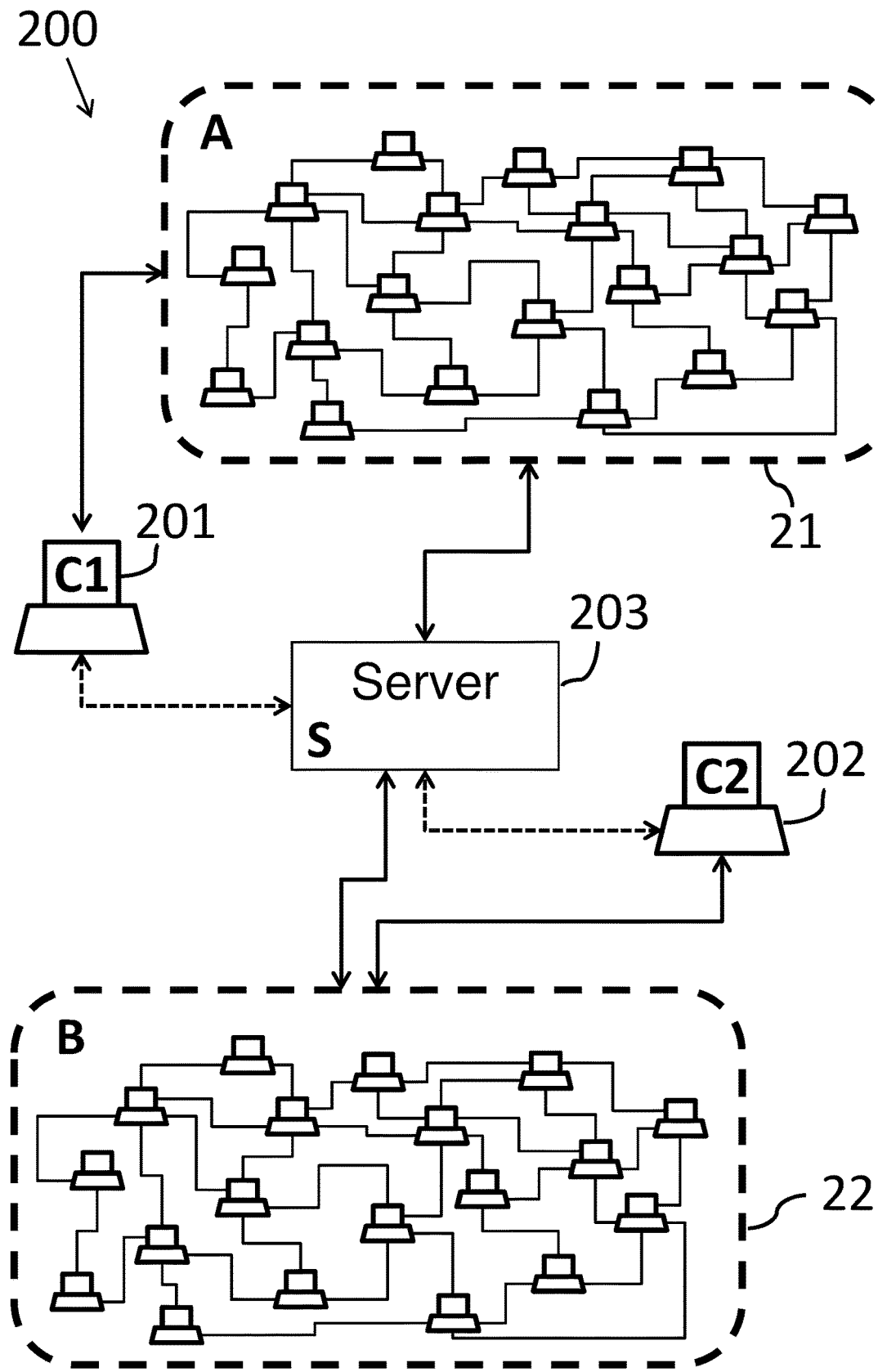
FIGS. 2A-2B show block diagrams of a system for cryptographic key distribution in a plurality of computer networks, according to some embodiments of the invention.
Figure 2B:
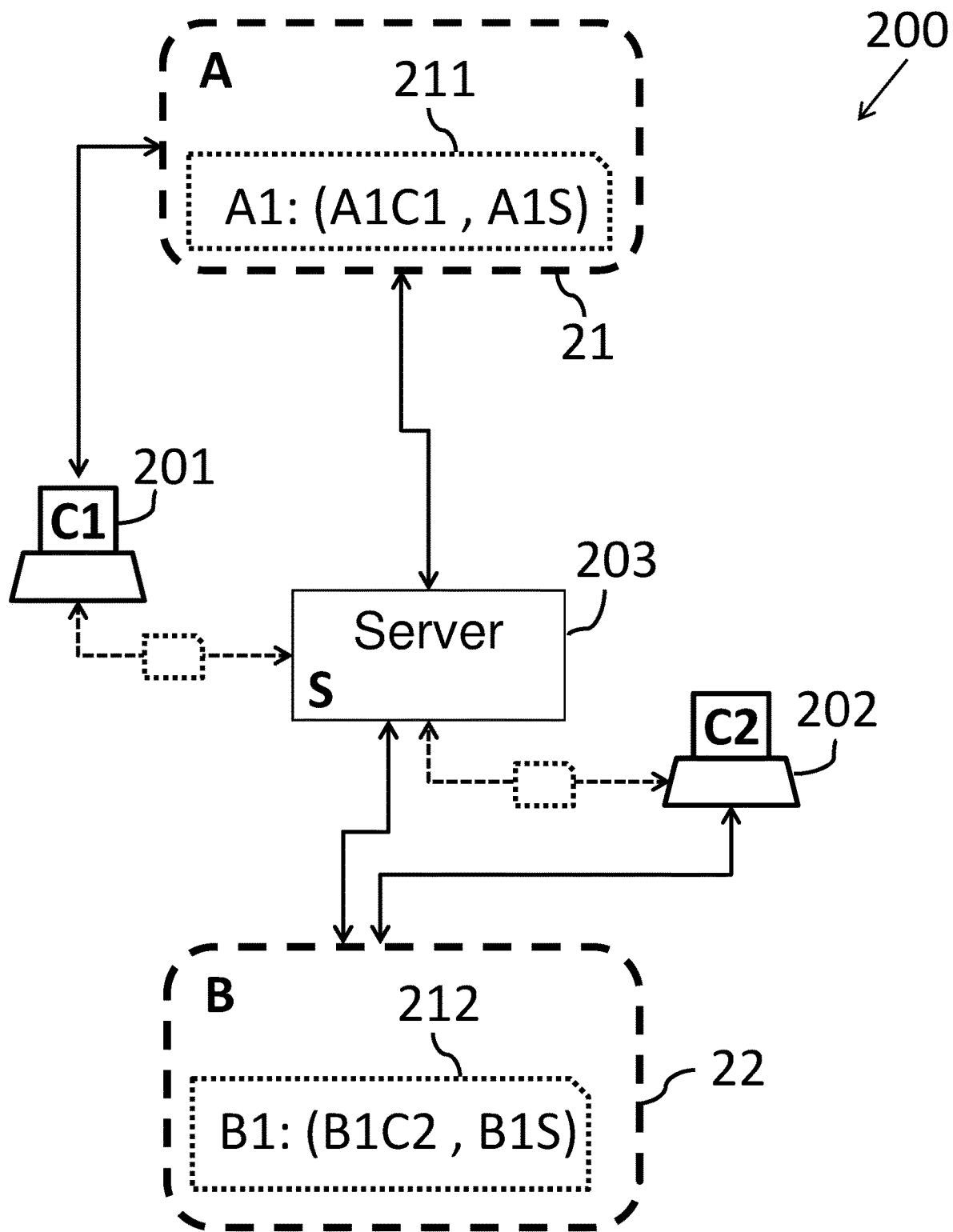

Reference is now made to FIGS. 2A-2B, which show block diagrams of a system 200 for cryptographic key distribution in a plurality of computer networks, according to some embodiments. In FIGS. 2A and 2B, hardware elements are indicated with a solid line and the direction of arrows may indicate the direction of information flow.

The system 200 may be configured to securely manage adding transactions to a ledger of at least one blockchain based computer network, for example utilizing a Multiparty Computation (MPC) protocol to jointly compute a function over the inputs from multiple parties, while keeping the inputs private, and split a cryptographic key into a plurality of shares or complementary portions of a single key, between a plurality of computing devices such that each party may hold a portion of the key corresponding to the transaction. In some embodiments, a distributed key generation MPC protocol may be used based on at least one of an elliptic curve digital signature algorithm (ECDSA), Edwards-curve digital signature algorithm (EdDSA) and a Schnorr signature algorithm. It should be appreciated that other MPC and signing protocols may be used as well. In some embodiments, the shares may be applied with threshold signatures addresses, where a threshold cryptosystem protects its private key by creating encrypted shares in a distributed manner among a plurality of computers, as explained herein. In order to sign a message, several parties (more than some threshold number) may cooperate in the signature protocol with corresponding signing, such as in the MPC protocol. In a threshold cryptosystem, at least one threshold signature address (e.g., one address for each party) may be assigned, where the number of such address may be greater than some threshold number.

The system 200 may include a first computing device 201, a second computing device 202 (e.g., such as computing device 100 shown in FIG. 1), and a server 203 communicating therebetween. The first computing device 201 may be in communication with a first computer network 21 and the second computing device 202 may be in communication with a second computer network 22 (e.g., different blockchain-based computer networks). The server 203 may be in communication with a plurality of computer networks in communication with the first computing device 201 and the second computing device 202, and particularly the server 203 may be in communication with the first computer network 21 as well as in communication with the second computer network 22.

It should be noted that while a single first computing device 201 and a single second computing device 202 are shown, any number of computing devices may similarly apply and therefore hereinafter a plurality of computing devices is described. Similarly, while a single first computer network 21 and a single second computer network 22 are shown, any number of computing networks may similarly apply and therefore hereinafter a plurality of computing networks is described. For clarity as well as easier distinction between the components of the system 200, some elements of the system are indicated in addition to their numerals, with the first computing device 201 indicated as 'C1', the second computing device 202 indicated as 'C2', the server 203 indicated as 'S', the first computer network 21 indicated as 'A' and the second computer network 21 indicated as 'B'. Data registered on these computer networks may be indicated as addresses 'A1', 'A2', 'B1', B2', etc.

Referring now to FIG. 2B. A first threshold signature address 'A1', on the first computer network 21 (A), may be controlled by the first computing device 201 (C1) together with the server 203 (S) as each party controls a portion of the key to that address, with a first cryptographic key 211 corresponding to the first threshold signature address 'A1'. For example, a user of each party (e.g., the first computing device 201 and/or the server 203) may register with at least one blockchain based computer network and credentials (e.g., a portion of a cryptographic key) associated with addresses on that network. The first threshold signature address 'A1' may include a first share or portion 'A1C1' of the first cryptographic key 211, the first portion 'A1C1' controlled by the first computing device 201 (C1), in combination with a second portion 'A1S' of the first cryptographic key 211 controlled by the server 203 (S). Similarly, a second threshold signature address 'B1', on the second computer network 22 (B), may be controlled by the second computing device 202 (C2) together with the server 203 (S), with a second cryptographic key 212 corresponding to the second threshold signature address 'B1'. The second threshold signature address 'B1' may include a first share or portion 'B1C2' of the second cryptographic key 212, the first portion 'B1C2' controlled by the second computing device 202 (C2), in combination with a second portion 'B1S' of the second cryptographic key 212 controlled by the server 203 (S).

Figure 2C:
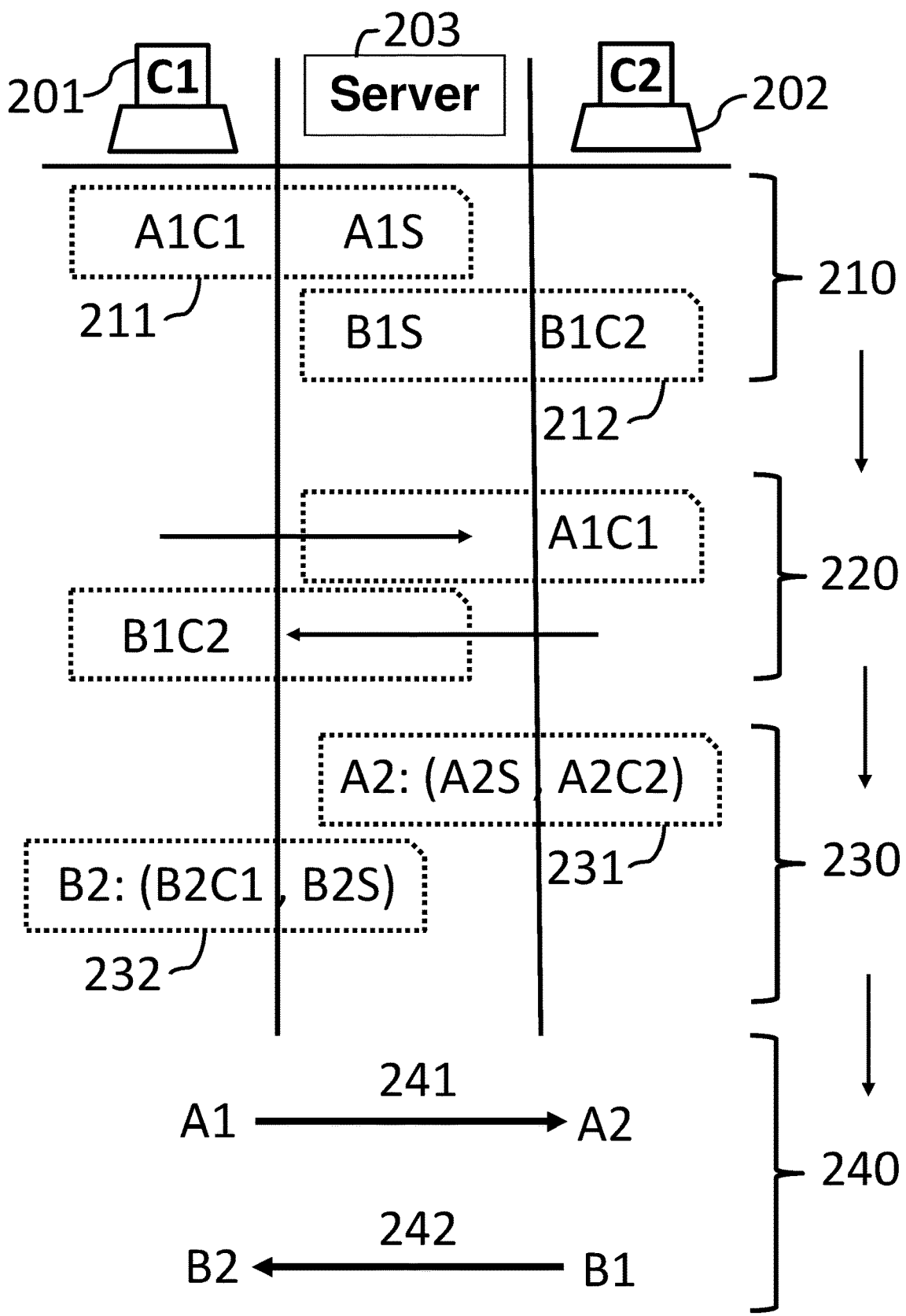
FIG. 2C shows a table of the cryptographic key distribution within the computer networks, according to some embodiments of the invention.

Reference is now made to FIG. 2C, which shows a table of the cryptographic key distribution within the computer networks, according to some embodiments. At an initial stage 210, each client or user of system 200, for instance the owner of the first computing device 201 (C1) and the owner of the second computing device 202 (C2), may control or be in possession of a vault and/or wallet (e.g., having an address), on at least one computer network, mutually controlled by two parties (each party or device controlling at least one portion), where the second portion is controlled by the server 203 (S) as provided by the threshold signature protocol and/or the MPC protocol. In some embodiments, for example, in case these clients or users of system 200 try to exchange data stored on different computer networks, for instance exchanging the content of their addresses (or "vaults") with cryptocurrencies stored on different blockchain based computer networks with different protocols, a third party may be required as a mediator.

In some embodiments, the system 200 may allow the first computing device 201 (C1) and the second computing device 202 (C2) to exchange data from different computer networks, for example data relating to ownership of keys to addresses on the different computer networks. The data is exchanged by carrying out a mutual key exchange, e.g., when the server 203 receives information about the key exchange and is accordingly aware of the exchange (e.g., arranging an exchange via the server 203 'S' and/or via mutual notification from the computing devices 'C1', 'C2'). For example, in some embodiment, the system 200 may arrange an exchange of at least some of the cryptocurrencies in the first computer network 'A' controlled by the first computing device 201 (C1) for at least some of the cryptocurrencies in the second computer network 'B' controlled by the second computing device 202 (C2). In some embodiments, to carry out the exchange, all parties, namely the first computing device 201 (C1), the second computing device 202 (C2) and the server 203 (S), may receive the public keys corresponding to all of the portions of the cryptographic keys.

In some embodiments, at least one processor of the system 200 may execute instructions on the first computing device 201 (C1), the second computing device 202 (C2) and/or the server 203 (S) to carry out the mutual key exchange. The first computing device 201 (C1) may share the first portion 'A1C1' of the first cryptographic key 211 with the second computing device 202 (C2). Similarly, the second computing device 202 (C2) may share the first portion 'B1C2' of the second cryptographic key 212 with the first computing device 201 (C1). In some embodiments, the first computing device 201 (C1) and the second computing device 202 (C2) exchange data via the server 203 (S) that is in communication with each of them.

At stage 220, in some embodiments, each one of the first computing device 201 (C1) and the second computing device 202 (C2) may control, for instance store at a dedicated memory or be in possession of, the first portion 'A1C 1' of the first cryptographic key 211 as well as the first portion 'B1C2' of the second cryptographic key 212. The first computing device 201 (C1) may send the first portion 'A1C1' of the first cryptographic key 211 to the second computing device 202 (C2), where the first portion 'A1C1' of the first cryptographic key 211 may be encrypted with the public key associated with the first threshold signature address 'A1' such that the second computing device 202 (C2) may verify the exchange, and no one else may eavesdrop (e.g., allowing confidentiality). Similarly, the second computing device 202 (C2) may send the first portion 'B1C2' of the second cryptographic key 212 to the first computing device 201 (C1), where the first portion 'B1C1' of the second cryptographic key 212 is encrypted with the public key associated with the second threshold signature address 'B1' such that the first computing device 201 (C1) may verify the exchange and no one else may eavesdrop.

In some embodiments, the server 203 (S) may enforce the exchange (e.g., the exchange is allowed only when all parties mutually share their portions) using the portions controlled, for instance stored at a dedicated memory, by the server 203 (S), namely the second portion 'A1S' of the first cryptographic key 211 and the second portion 'B1S' of the second cryptographic key 212. It should be noted that enforcement by the server 203 (S), may prevent data exchange by each computing device of their original keys, unless the exchange is mutual and the server 203 (S) is involved. For example, the server 203 (S) may prevent the first computing device 201 (C1) and the second computing device 202 (C2) from extracting data (or cryptocurrencies) from the first threshold signature address 'A1' and/or from the second threshold signature address 'B1' unless the exchange is allowed. In some embodiments, communications between the first computing device 201 (C1) and the second computing device 202 (C2) may be facilitated and verified via the server 203 (S), as the contents of the communications may not be visible to the server 203 (S) for instance due to a confidentiality requirement.

According to some embodiments, at least one new threshold signature address may be generated to transfer data (or cryptocurrencies) thereto at stage 230. The second computing device 202 (C2) may generate or register a third threshold signature address 'A2' on the first computer network 21 'A' with a corresponding third cryptographic key 231, in order to carry out data exchange from the first threshold signature address 'A1' to the third threshold signature address 'A2' at a later stage. A first portion 'A2C2' of the third cryptographic key 231 may be controlled by the second computing device 202 (C2), and a corresponding second portion 'A2S' of the third cryptographic key 231 may be controlled by the server 203 (S) may be combined to correspond to the third address 'A2'.

Similarly, the first computing device 201 (C1) may generate or register a fourth threshold signature address 'B2' on the second computer network 22 'B' with a corresponding fourth cryptographic key 232, in order to carry out data exchange from the second threshold signature address 'B1' to the fourth threshold signature address 'B2' at a later stage. A first portion 'B2C1' of the fourth cryptographic key 232 may be controlled by the first computing device 201 (C1), and a corresponding second portion 'B2S' of the fourth cryptographic key 232 may be controlled by the server 203 (S) such that these portions may be combined to correspond to the fourth address 'B2'. In some embodiments, at least one of the third address 'A2' and the fourth address 'B2' may be a threshold signature address. In some embodiments, at least one of the first threshold signature address 'A1' and the second threshold signature address 'B1' may be encrypted by the corresponding public key.

According to some embodiments, at stage 240 a first transaction 241 may be signed on the first computer network 21 (A) with data exchange from the first threshold signature address 'A1' to the third address 'A2' when the one or more details of the first transaction 241 are validated by the server 203 (S). For example, the first transaction 241 may include transfer of a certain amount of a cryptocurrency, on the first computer network 21 'A', from the first threshold signature address 'A1' (controlled by the first computing device 201 and the server 203) to the third address 'A2' (controlled by the second computing device 202 and the server 203) in exchange for a similar transaction on the second computer network 22 (B). In some embodiments, the exchange in the first transaction 241 may include a unit of a cryptographic currency.

Similarly, a second transaction 242 may be signed on the second computer network 22 (B) with data exchange from the second threshold signature address 'B1' to the fourth address 'B2' when the one or more details of the second transaction 242 are validated by the server 203 (S). In some embodiments, validation by the server 203 (S) may include validating that the transaction is carried out by the computing devices 'C1' and 'C2' controlling the corresponding addresses 'A1', 'A2', 'B1', 'B2'.

According to some embodiments, at stage 240 signing the first transaction 241 may be initiated by the second computing device 202 (C2). The signing of the first transaction 241 may include using the first portion 'A1C1' of the first cryptographic key 211, previously received from the first computing device 201 (C1) at stage 220, and corresponding to the first threshold signature address 'A1'. To complete the first transaction 241, the server 203 (S) may verify the details of the transaction (e.g., verify that the terms of the exchange are carried out) and the first transaction 241 may be signed by the server 203 (S) using the second portion 'A1S' of the first cryptographic key 211.

Similarly, at stage 240 signing the second transaction 242 may be initiated by the first computing device 201 (C1). The signing of the second transaction 242 may include using the first portion 'B1C2' of the second cryptographic key 212, previously received from the second computing device 202 (C2) at stage 220, and corresponding to the second threshold signature address 'B1'. To complete the second transaction 242, the server 203 (S) may verify the details of the transaction (e.g., verify that the terms of the exchange are carried out) and the second transaction 242 may be signed by the server 203 (S) using the second portion 'B1S' of the second cryptographic key 212, for instance concurrently.

With such transactions 241 and 242 executed to carry out the exchange, neither of the users of the first computing device 201 (C1) and the second computing device 202 (C2), nor the server 203 (S), may maliciously lock or overtake the control of the other user's threshold signature address (e.g., lock the other user from using their cryptocurrencies).

According to some embodiments, new threshold signature-controlled addresses may be generated such that each such new address may be mutually controlled by the first computing device 201 (C1), the second computing device 202 (C2) and the server 203 (S) having cryptographic keys with three portions. In order to facilitate the mutual control, all parties controlling a certain address may receive the corresponding public key.

Figure 3A:
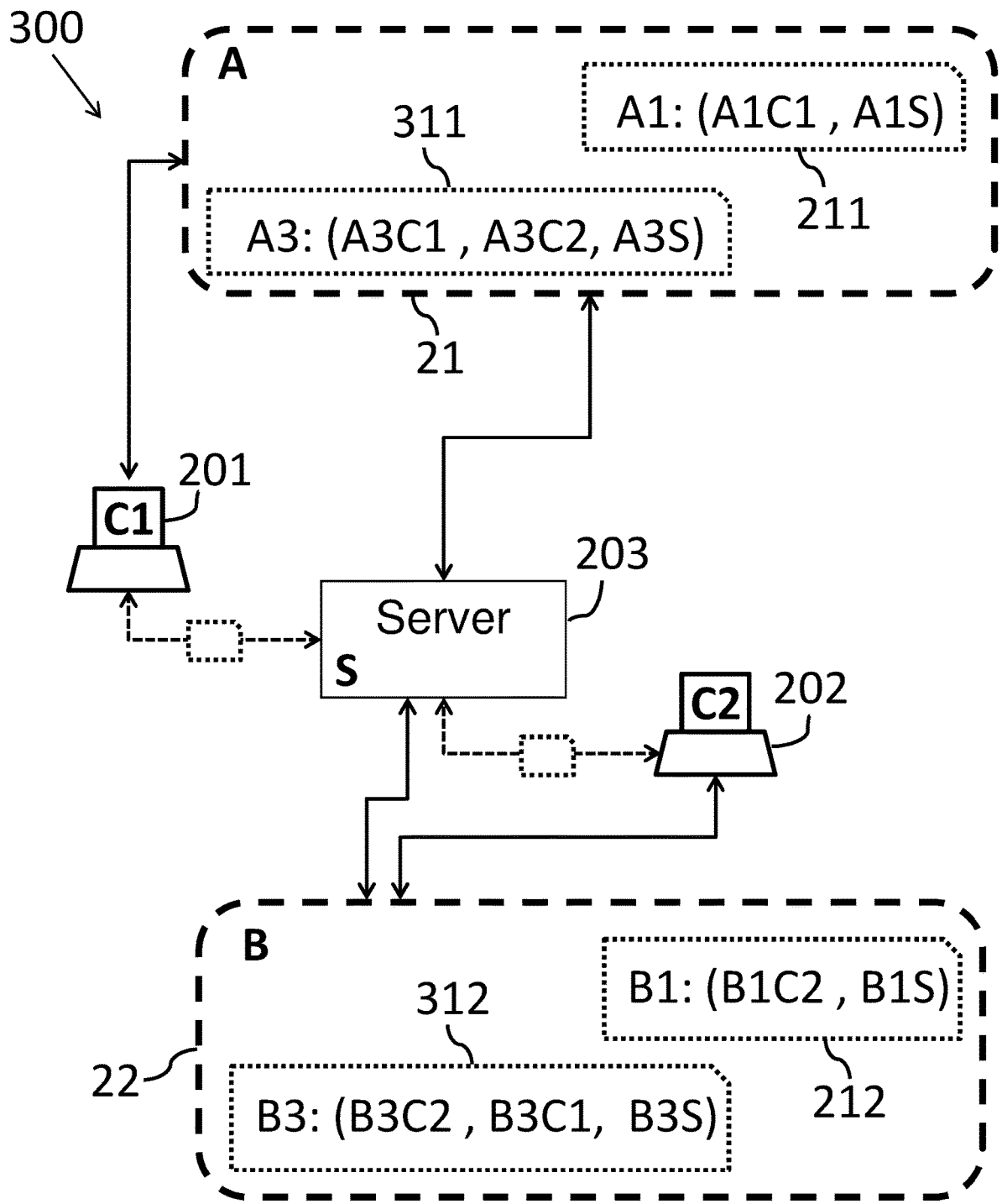
FIG. 3A shows a block diagram of another system 300 for cryptographic key distribution in a plurality of computer networks, according to some embodiments of the invention.

Reference is now made to FIG. 3A, which shows a block diagram of another system 300 for cryptographic key distribution in a plurality of computer networks, according to some embodiments. In FIG. 3A, hardware elements are indicated with a solid line and the direction of arrows may indicate the direction of information flow. In some embodiments, at least some elements in system 300 may have the same or similar functionality as the equivalent elements described for system 200 (shown in FIGS. 2A-2C). For example, the first computing device 201 (C1) in system 300 may control the first threshold signature address 'A1' on the first computer network 21 'A' together with the server 203 (S), and the second computing device 202 (C2) in system 300 may control the second threshold signature address 'B1' on the second computer network 22 'B' together with the server 203 (S).

In some embodiments, the first computing device 201 (C1) may generate or register a fifth threshold signature address 'A3' on the first computer network 21 'A' with a corresponding fifth cryptographic key 311, in order to carry out data exchange from the first threshold signature address 'A1' to the fifth threshold signature address 'A3' at a later stage. A first portion 'A3C1' of the fifth cryptographic key 311 may be controlled by the first computing device 201 (C1), a corresponding second portion 'A3C2' of the fifth cryptographic key 311 may be controlled by the second computing device 202 (C2), and a corresponding third portion 'A3S' of the fifth cryptographic key 311 may be controlled by the server 203 (S), such that these portions may be combined to correspond to the fifth threshold signature address 'A3'.

Similarly, the second computing device 202 (C2) may generate or register a sixth threshold signature address 'B3' on the second computer network 22 'B' with a corresponding sixth cryptographic key 312, in order to carry out data exchange from the second threshold signature address 'B1' to the sixth threshold signature address 'B3' at a later stage. A first portion 'B3C2' of the sixth cryptographic key 312 may be controlled by the second computing device 202 (C2), a corresponding second portion 'B3C1' of the sixth cryptographic key 312 may be controlled by the first computing device 201 (C1), and a corresponding third portion 'B3S' of the sixth cryptographic key 312 may be controlled by the server 203 (S), such that these portions may be combined to correspond to the sixth threshold signature address 'B3'. In some embodiments, at least one of the fifth threshold signature address 'A3' and the sixth threshold signature address 'B3' may be encrypted by the corresponding public key.

Figure 3B:
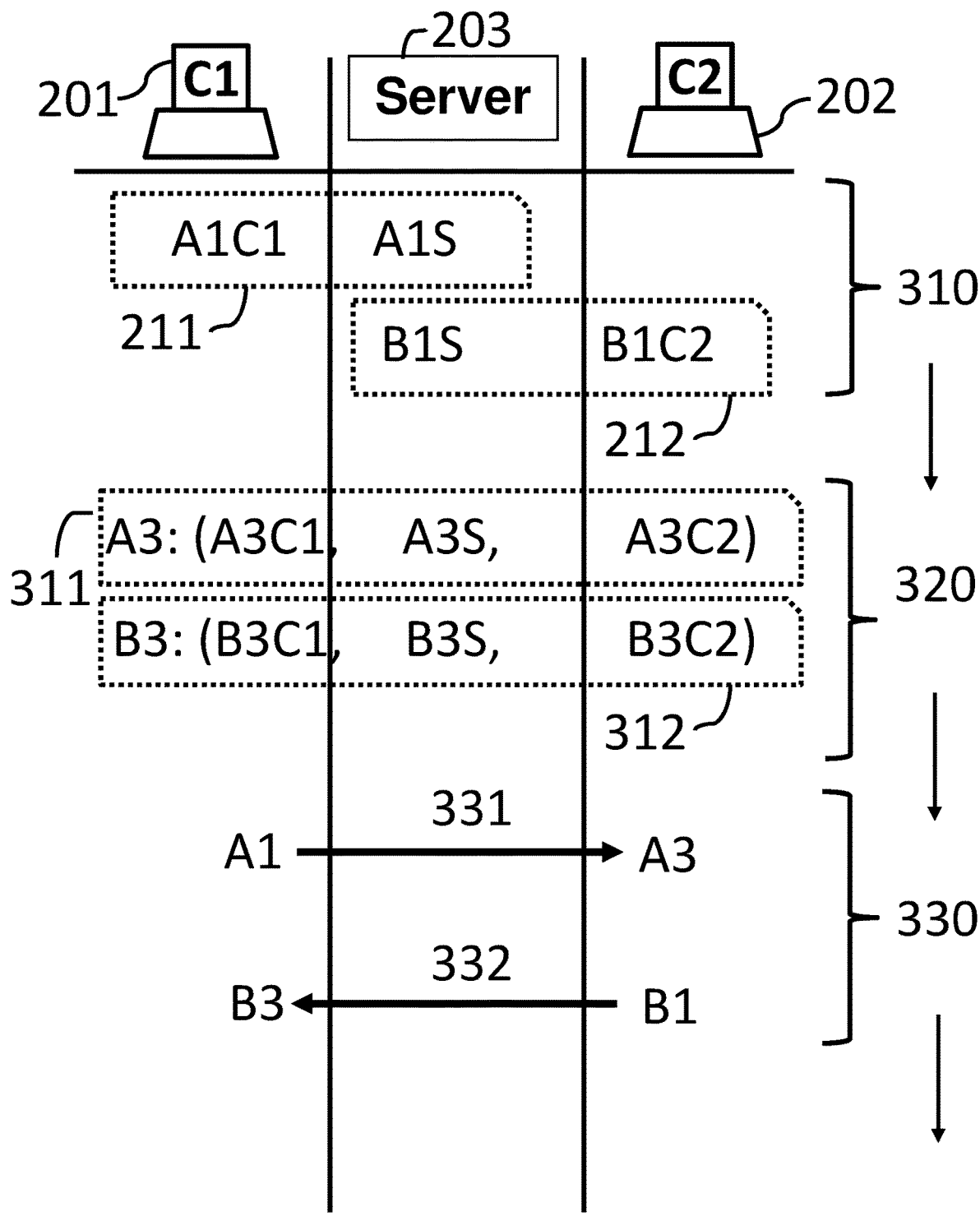
FIGS. 3B-3C show another table of the cryptographic key distribution within the computer networks, according to some embodiments of the invention.
Figure 3C:
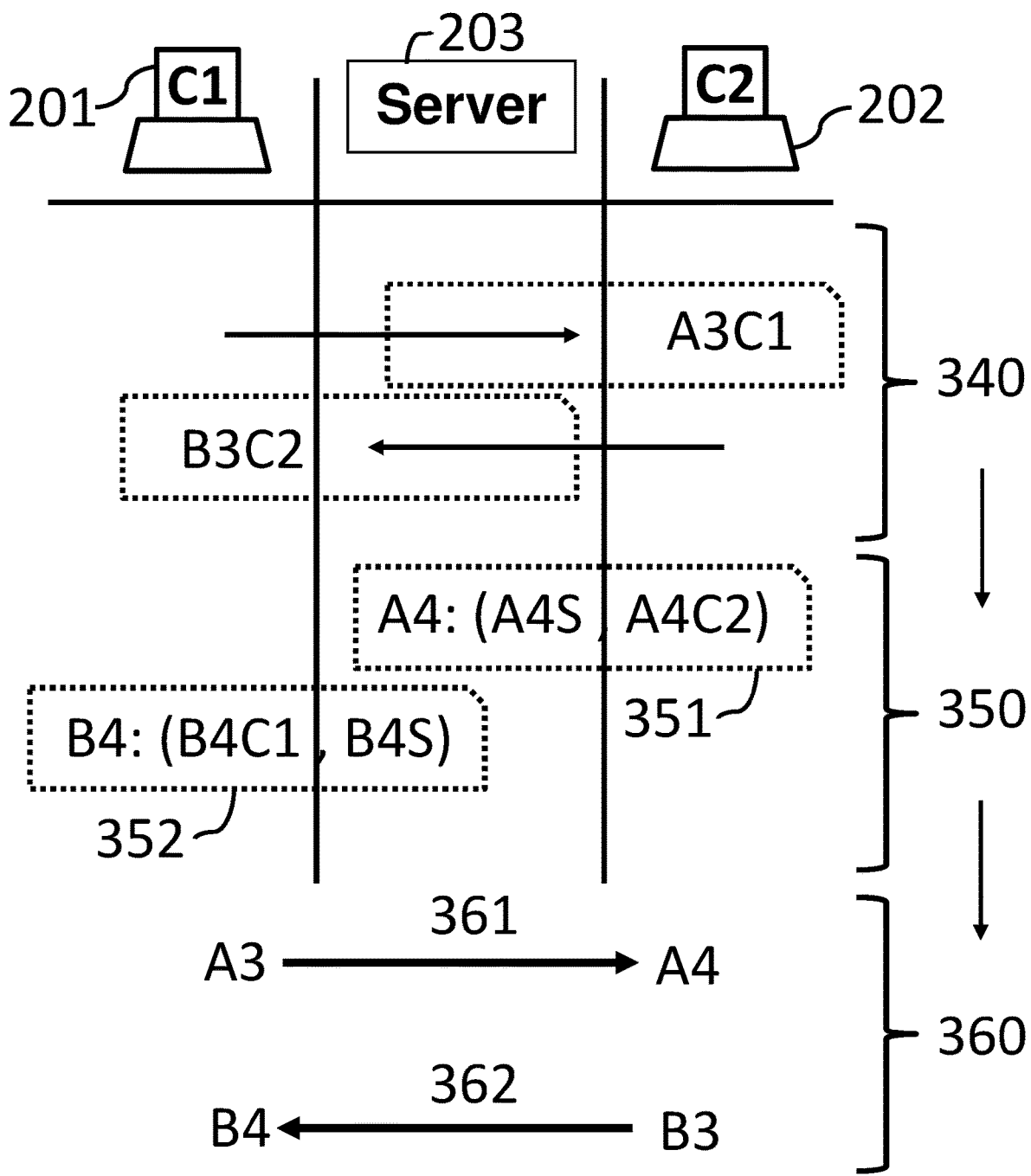

Reference is now made to FIGS. 3B-3C, which show another table of cryptographic key distribution within the computer networks, according to some embodiments. At an initial stage 310, each client or user of system 300, for instance the owner of the first computing device 201 (C1) and the owner of the second computing device 202 (C2), may control or be in possession of an address, on at least one computer network, mutually controlled by two or three parties (each party or device controlling at least one portion), where the second portion is controlled by the other computing device and/or by the server 203 (S) as provided by the threshold signature protocol and/or the MPC protocol. In stage 320, the first computing device 201 (C1) and the second computing device 202 (C2) may generate the fifth threshold signature address 'A3' and the sixth threshold signature address 'B3', respectively.

The system 300 may allow the first computing device 201 (C1) and the second computing device 202 (C2) to exchange data from different computer networks, e.g., by carrying out a mutual key exchange when the server 203 received information about the key exchange and is accordingly aware of the exchange (e.g., arranging and/or coordinating an exchange via the server 203 'S' and/or via mutual notification from the computing devices 'C1', 'C2'). In some embodiments, to carry out the exchange, all parties, namely the first computing device 201 (C1), the second computing device 202 (C2) and the server 203 (S), may receive the public keys corresponding to all of the portions of the cryptographic keys.

For example, in some embodiments, the system 300 may arrange an exchange of at least some of the cryptocurrencies in the first computer network 'A' controlled by the first computing device 201 (C1) for at least some of the cryptocurrencies in the second computer network 'B' controlled by the second computing device 202 (C2). To facilitate an exchange, in some embodiments, the first computing device 201 (C1) and the second computing device 202 (C2) may create a proposed transaction to transfer cryptocurrencies to the new address (e.g., use their portions of the cryptographic keys to unlock the addresses together) together with the consent of the server 203 (S). For example, the proposed transaction may be created via a dedicated user interface and/or website and/or an application programming interface (API).

In some embodiments, at least one processor of the system 300 may execute instructions on the first computing device 201 (C1), the second computing device 202 (C2) and/or the server 203 (S) to carry out the mutual key exchange.

According to some embodiments, at stage 330 a third transaction 331 may be signed on the first computer network 21 (A) with data exchange from the first threshold signature address 'A1' to the fifth address 'A3' when the one or more details of the third transaction 331 are validated by the server 203 (S). For example, the third transaction 331 may include transfer of a certain amount of cryptocurrency, on the first computer network 21 'A', from the first threshold signature address 'A1' (controlled by the first computing device 201, the second computing device 202, and the server 203) to the fifth threshold signature address 'A3' (controlled by the first computing device 201, the second computing device 202, and the server 203) in exchange for a similar transaction on the second computer network 22 (B). In some embodiments, the exchange in the third transaction 331 may include a unit of a cryptographic currency.

Similarly, a fourth transaction 332 may be signed on the second computer network 22 (B) with data exchange from the second threshold signature address 'B1' to the sixth address 'B3' when the one or more details of the fourth transaction 332 are validated by the server 203 (S). In some embodiments, validation by the server 203 (S) may include validating that the transaction is carried out by the computing devices 'C1' and 'C2' controlling the corresponding addresses 'A1', 'A3', 'B1', and 'B3'.

According to some embodiments, at stage 330 signing the third transaction 331 may be initiated by the first computing device 201 (C1). The signing of the third transaction 331 may include using the first portion 'A1C1' of the first cryptographic key 211 and corresponding to the first threshold signature address 'A1'. To complete the third transaction 331, the server 203 (S) may verify the details of the transaction (e.g., verify that the terms of the exchange are carried out) and the third transaction 331 may be signed by the server 203 (S) using the second portion 'A1S' of the first cryptographic key 211.

In some embodiments, the server 203 (S) may publish the third transaction 331 in the first computer network 21 (A) and/or publish the fourth transaction 332 in the second computer network 22 (B).

With such transactions 331 and 332 being executed to carry out the exchange, neither of the users of the first computing device 201 (C1) and the second computing device 202 (C2), nor the server 203 (S), may maliciously lock or overtake the control of the other user's threshold signature address (e.g., lock other user from using their cryptocurrencies).

Similarly, at stage 330, in some embodiments, signing the fourth transaction 332 may be initiated by the second computing device 202 (C2). The signing of the fourth transaction 332 may include using the first portion 'B1C2' of the second cryptographic key 212 corresponding to the second threshold signature address 'B1'. To complete the fourth transaction 332, in some embodiments, the server 203 (S) may verify the details of the transaction (e.g., verify that the terms of the exchange are carried out), and the fourth transaction 332 may be signed by the server 203 (S) using the second portion 'B1S' of the second cryptographic key 212.

According to some embodiments, the first computing device 201 (C1) may share at least one portion of the corresponding cryptographic key with the second computing device 202 (C2), and vice versa, in order to gain control of the new address in stage 340.

In some embodiments, the first computing device 201 (C1) may share the first portion 'A3C1' of the fifth cryptographic key 311 with the second computing device 202 (C2). Similarly, the second computing device 202 (C2) may share the first portion 'B3C2' of the sixth cryptographic key 312 with the first computing device 201 (C1). In some embodiments, the first computing device 201 (C1) and the second computing device 202 (C2) may exchange data via the server 203 (S), which is in communication with each of them.

At stage 340, in some embodiments, each one of the first computing device 201 (C1) and the second computing device 202 (C2) may control, for instance store at a dedicated memory or be in possession of, the first portion 'A3C1' of the fifth cryptographic key 311, as well as the first portion 'B3C2' of the sixth cryptographic key 312. The first computing device 201 (C1) may therefore control the first portion 'A3C1' and the second portion 'A3C2' of the fifth cryptographic key 311, thereby having two portions out of three. Similarly, the second computing device 202 (C2) may therefore control the first portion 'B3C1' and the second portion 'B3C2' of the sixth cryptographic key 312, thereby having two portions out of three, such that each of the first computing device 201 (C1) and the second computing device 202 (C2) may only need the server 203 (S) to control the fifth address 'A3' and sixth address 'B3', respectively.

In some embodiments, the first computing device 201 (C1) may send the first portion 'A3C1' of the fifth cryptographic key 311 to the second computing device 202 (C2), where the first portion 'A3C1' of the fifth cryptographic key 311 is encrypted with the public key associated with the fifth threshold signature address 'A3', such that the second computing device 202 (C2) may verify the exchange and no one else may eavesdrop (e.g., allowing confidentiality). Similarly, the second computing device 202 (C2) may send the first portion 'B3C2' of the sixth cryptographic key 312 to the first computing device 201 (C1), where the first portion 'B3C1' of the sixth cryptographic key 312 is encrypted with the public key associated with the sixth threshold signature address 'B3', such that the first computing device 201 (C1) may verify the exchange and no one else may eavesdrop.

In some embodiments, the server 203 (S) may enforce the exchange using the portions controlled, for instance, stored at a dedicated memory by the server 203 (S), namely the second portion 'A3S' of the fifth cryptographic key 311 and the second portion 'B3S' of the sixth cryptographic key 312. It should be noted that enforcement by the server 203 (S) may prevent data exchange by each computing device of their original keys, unless the exchange is mutual and the server 203 (S) is involved. For example, the server 203 (S) may prevent the first computing device 201 (C1) and the second computing device 202 (C2) from extracting data (or cryptocurrencies) from the fifth threshold signature address 'A3' and/or from the sixth threshold signature address 'B3'. In some embodiments, communications between the first computing device 201 (C1) and the second computing device 202 (C2) may be facilitated and/or verified via the server 203 (S), as the contents of the communications may not be visible to the server 203 (S), for example, due to the confidentiality feature.

In some embodiments, at least a portion of a fifth cryptographic key 311 and at least a portion of a sixth cryptographic key 312 may be encrypted in accordance with an incremental cryptographic share exchange protocol, the protocol incremental cryptographic share exchange being configured to decrypt shares of cryptographic keys by multiple parties.

For example, encryption of the abovementioned cryptographic keys may be carried out using an encryption scheme with homomorphic properties (e.g., homomorphic El-Gamal encryption). In some embodiments, Homomorphic encryption may allow computation on ciphertexts, and when decrypted, the result may match the result of the operations as if they had been performed on the plaintext. For elliptic curve parameters 'G', 'q' and security parameter 'λ' (indicating the type of permutation used for the key generation), every party may choose a random $γ∈Z_q$ for a secret key and may calculate Y=γG for the public key, where all public keys may be previously registered. Upon input of ('x', 'Q', 'Y') where 'Q' and 'Y' are public keys and 'x' is a secret key such that Q=xG the encryptor may divide 'x' to 'm' equal segments. For every segment 'k', the encryptor may calculate the homomorphic El-Gamal encryption: $\{D_k, E_k\} = \{(x)_k G + r_k Y, r_k G\}$ for a random $r_k$. The encryption for a segment $(x)_k$ may be full once the encryptor publishes $E_k$ of this segment together with a proof of correct encryption.

For decryption, given secret key 'y', every pair $\{D_k, E_k\}$, $(x)_k$ may be decrypted by extracting $(x)_k$ from $D_k - \gamma E_k = (x)_k G$ using e.g., an algorithm for breaking DLog. Once all 'm' segments are decrypted, $x = \Sigma_k f_k(x)_k$ may be reconstructed. Of course, in other embodiments other encryption/decryption schemes maybe be used.

Turning to FIG. 3C, according to some embodiments, at least one new threshold signature address with two shares may be generated to transfer data (e.g., representing cryptocurrency) thereto at stage 350, such that each computing device may control the new address only with the server with a two portion key instead of a three portion key shared with the other computing device. The second computing device 202 (C2) may generate at least one seventh threshold signature address 'A4' on the first computer network 21 (A) that may be controlled by the second computing device 202 (C2) and the server 203 (S). For example, the seventh threshold signature address 'A4' may include a first portion 'A4C2' (controlled by the second computing device 202) and a second portion 'A4S' (controlled by the server 203) for the corresponding seventh cryptographic key 351.

Similarly, the first computing device 201 (C1) may generate at least one eighth threshold signature address 134' on the second computer network 22 (B) that may be controlled by the first computing device 201 (C1) and the server 203 (S). For example, the eighth threshold signature address 134' may include a first portion 'B4C1' (controlled by the first computing device 201) and a second portion 'B4S' (controlled by the server 203) for the corresponding eighth cryptographic key 352.

In some embodiments, to facilitate an exchange, the first computing device 201 (C1) and the second computing device 202 (C2) may create another proposed transaction to transfer cryptocurrencies to the new address (e.g., use their portions of the cryptographic keys to unlock the addresses together) together with the consent of the server 203 (S). In some embodiments, at least one processor of the system 300 may execute instructions on the first computing device 201 (C1), the second computing device 202 (C2) and/or the server 203 (S) to carry out the mutual key exchange.

According to some embodiments, at stage 360, a fifth transaction 361 may be signed on the first computer network 21 (A) with data exchange from the fifth threshold signature address 'A3' to the seventh threshold signature address 'A4' when the one or more details of the fifth transaction 361 are validated by the server 203 (S). Signing the fifth transaction 361 by the second computing device 202 (C2) may include using the first portion 'A3C1' of the fifth cryptographic key 311 (previously received at stage 340) and the second portion 'A3C2' of the fifth cryptographic key 311, corresponding to the fifth threshold signature address 'A3'. To complete the fifth transaction 361, the server 203 (S) may use the third portion 'A3S' of the seventh cryptographic key 361, when the one or more details of the fifth transaction 361 are validated by the server 203 (S).

Similarly, a sixth transaction 362 may be signed on the second computer network 22 (B) with data exchange from the sixth threshold signature address 'B3' to the eighth threshold signature address 'B4' when the one or more details of the sixth transaction 362 are validated by the server 203 (S). Signing the sixth transaction 362 by the first computing device 201 (C1) may include using the first portion 'B3C1' of the sixth cryptographic key 312 and the second portion 'B3C2' (previously received at stage 340) of the sixth cryptographic key 312, corresponding to the sixth threshold signature address 'B3'. To complete the sixth transaction 362, the server 203 (S) may use the third portion 'B3S' of the eighth cryptographic key 362, when the one or more details of the sixth transaction 362 are validated by the server 203 (S).

According to some embodiments, the server 203 in system 300 may be unable to maliciously take advantage of the assets of the first computing device 201 and/or the second computing device 202 since no new entities are introduces to the scheme, the server 203 is not allowed to use the assets of the computing devices, and the server 203 may only enforce the fairness of the transaction. In some embodiments, with the publication of the transactions, each party in the exchange may verify that all details are correct (e.g., verify that the correct amount of cryptocurrency is transferred to the correct address).

In some embodiments, the exchange of control may be carried out as fairly as possible, as the different parties exchange the control of the address in a gradual (e.g., bit for bit) manner. A rogue party may quit in the middle and leave the other party locked of their assets, but may also be heavily incentivized not to do so, as it would lock the rogue party's own assets too. At worst, the rogue party may gain a single bit advantage, which is not a material advantage compared to its own loss of assets, since having a single bit advantage may only give the advantage to the party having one less bit to guess.

In some embodiments, the system 300 may be ubiquitous across blockchain-based computer networks, since the solution works on the mathematical level and as a result is agnostic to the specifics of the exchanged assets in the blockchain including the scripting capabilities of the different blockchains and/or the network's choice of elliptic curves.

In some embodiments, using the already installed server 203 for communications, the parties may refrain from creating a direct connection, and thereby may refrain from disclosing parameters of their identity (such as their IP address) without compromising on the confidentiality or verifiability of the communications and/or allow communications in harsh environments (e.g., over mobile internet) in which connections often break.

Figure 4A:
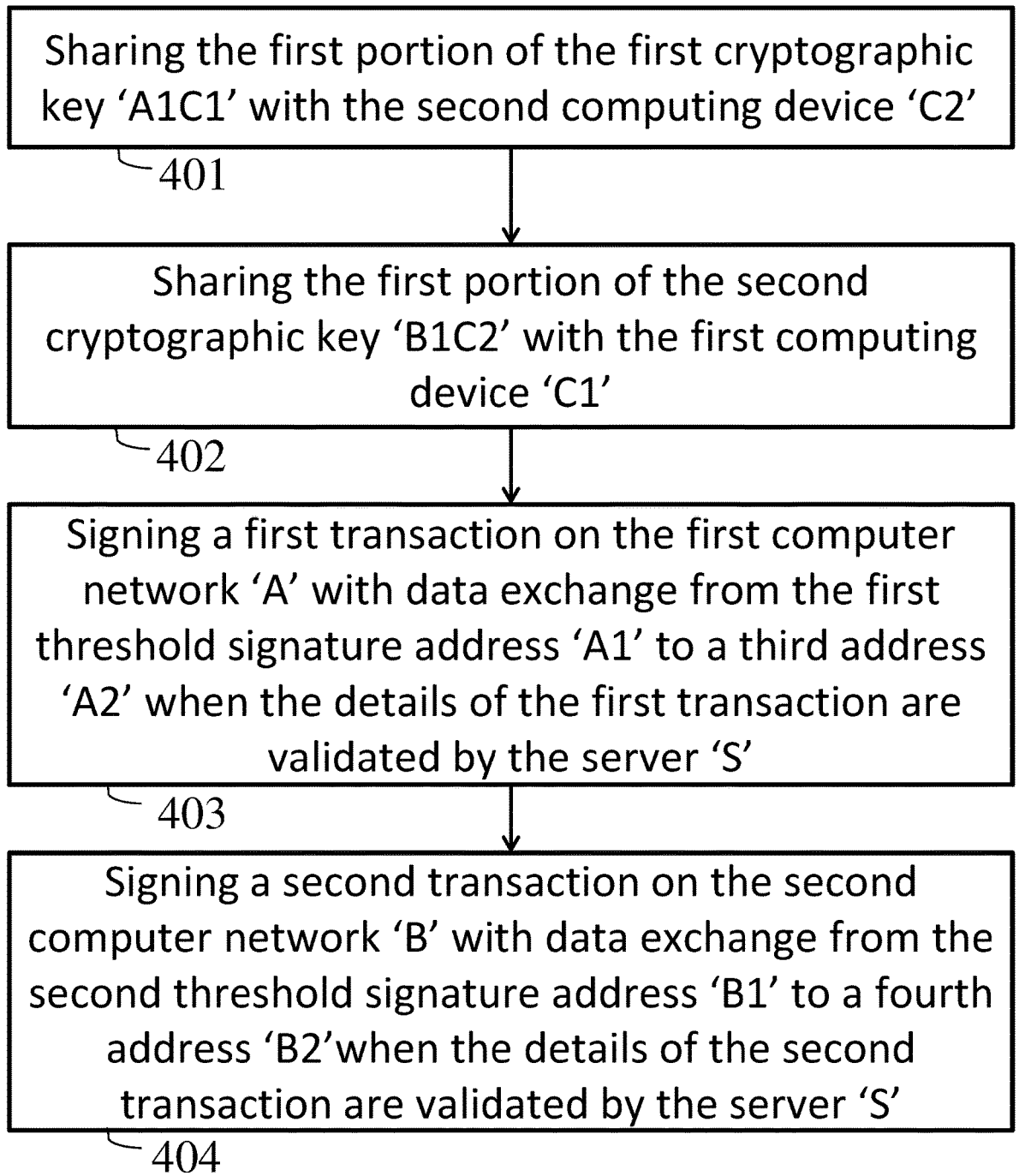
FIG. 4A shows a flowchart of a method of cryptographic key distribution in a plurality of computer networks, according to some embodiments of the invention.
Figure 4C:
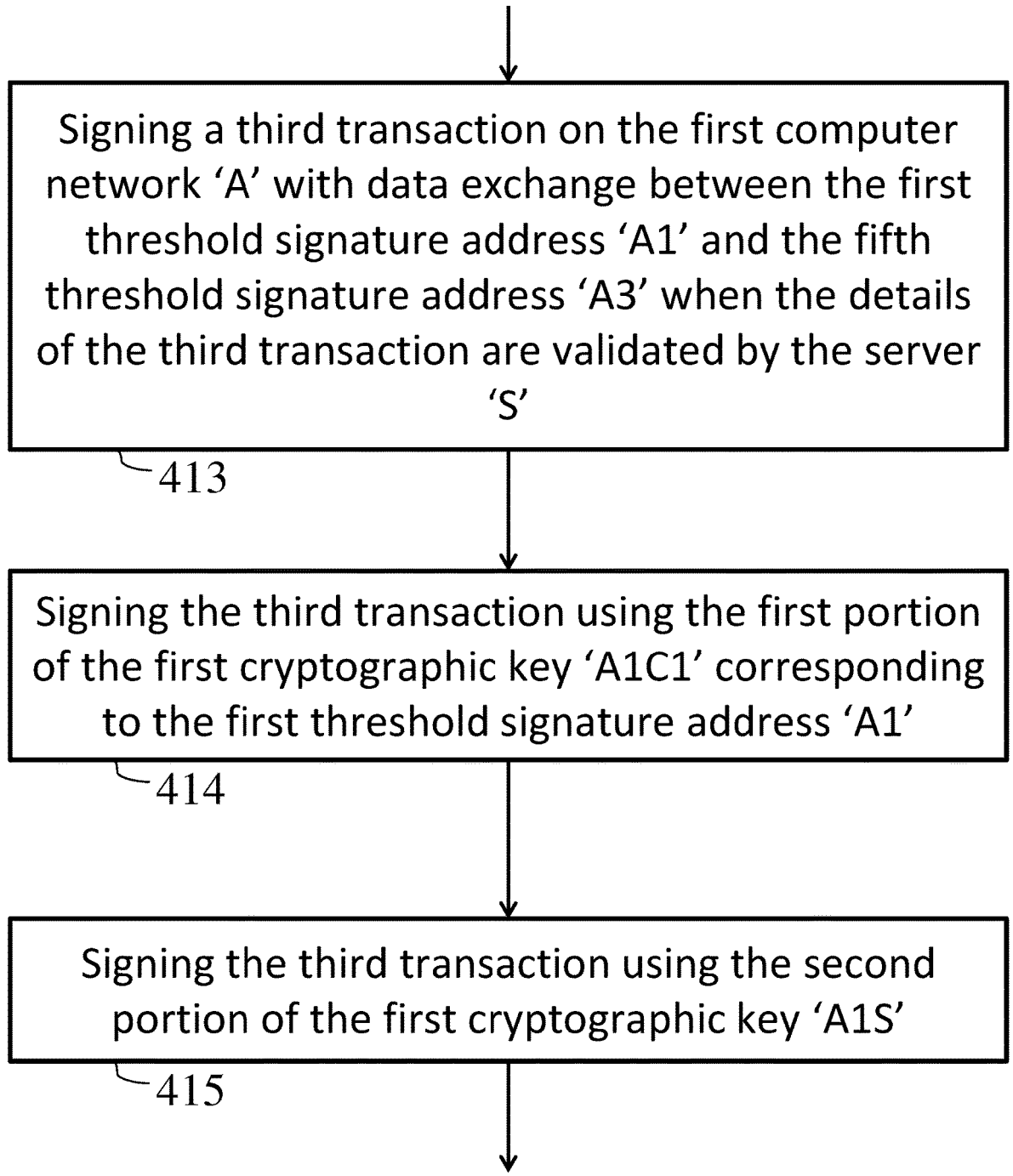
Figure 4D:
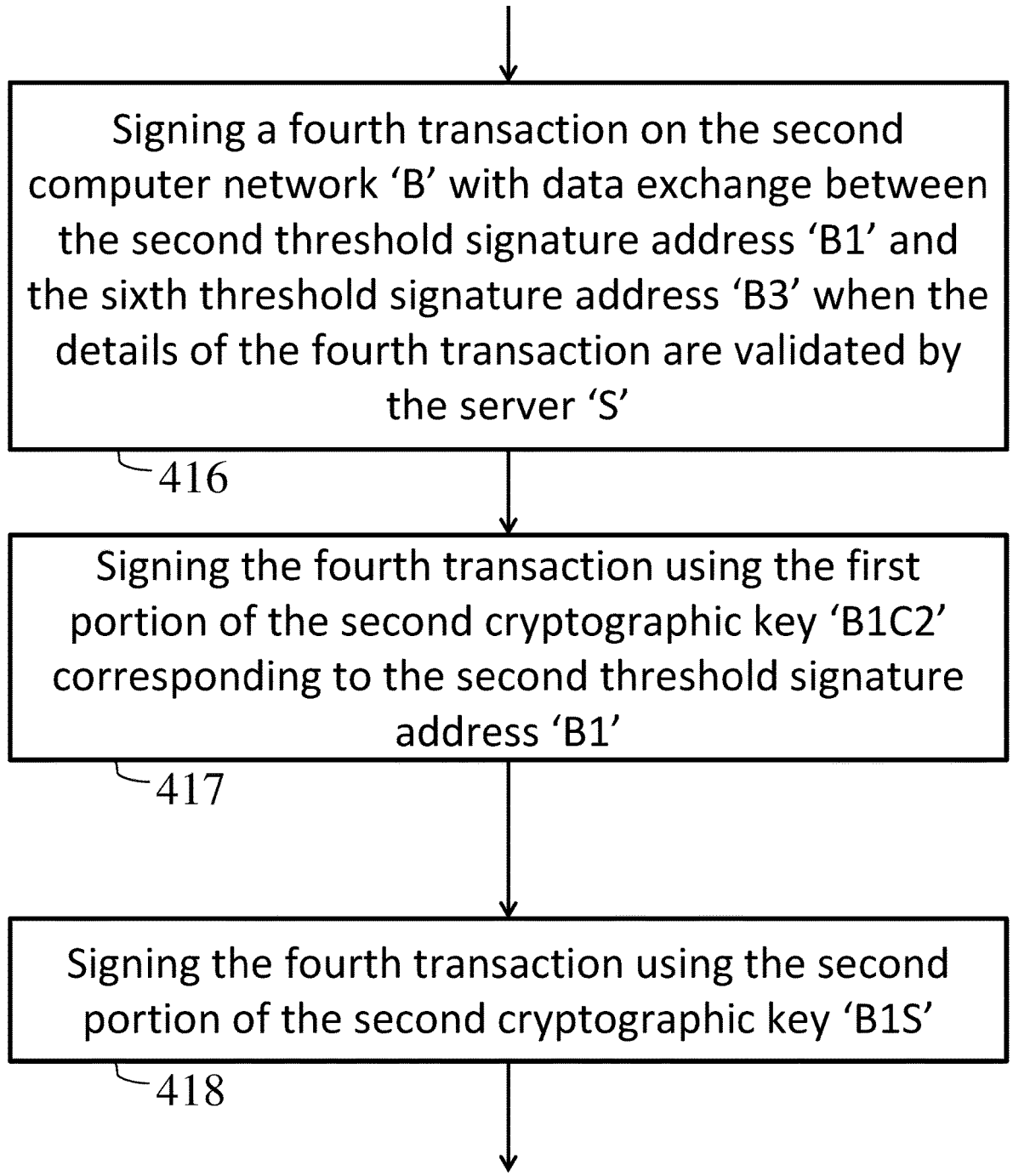
Figure 4E:
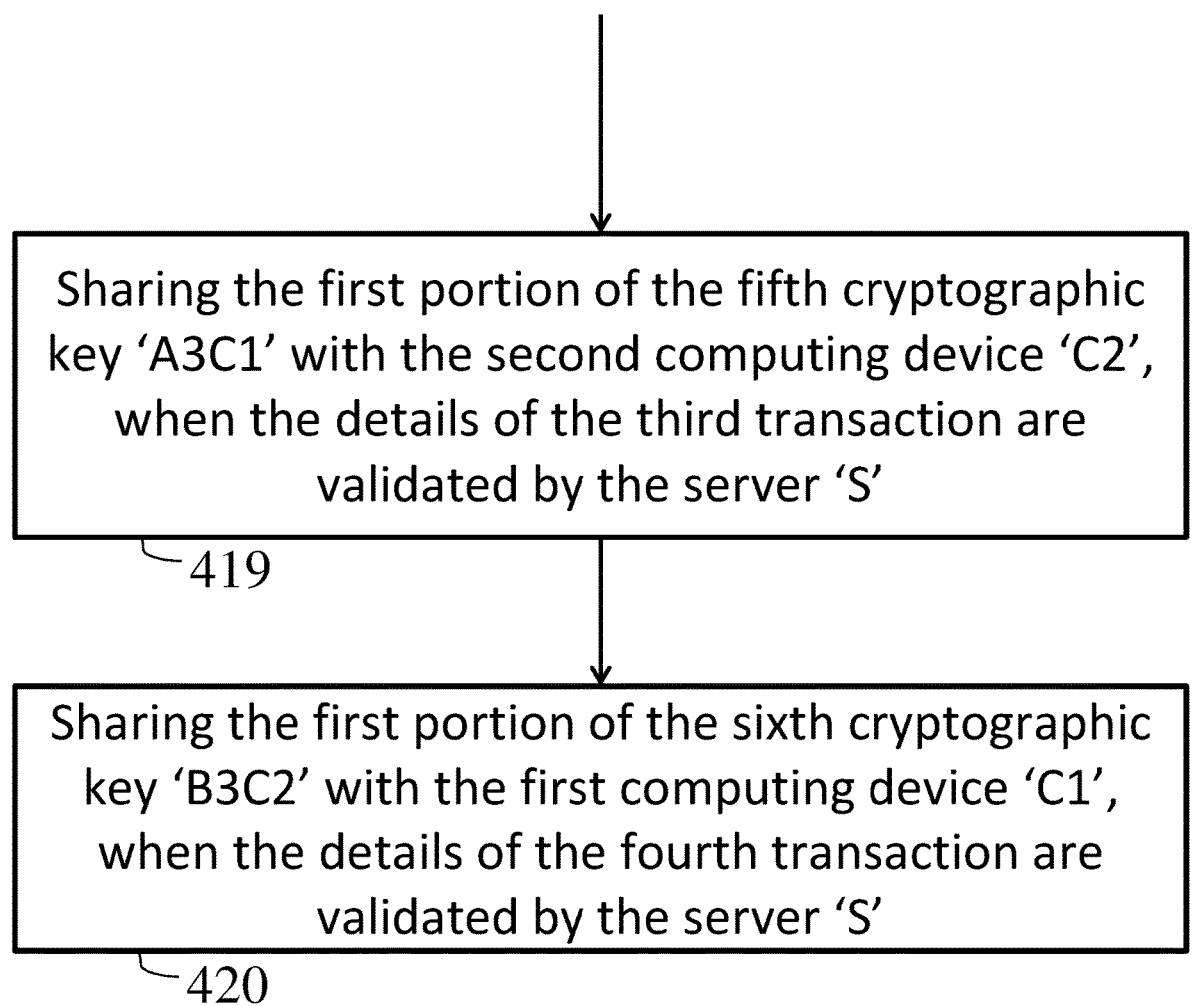

Reference is now made to FIG. 4A, which shows a flowchart of a method of cryptographic key distribution in a plurality of computer networks, according to some embodiments. At step 401, in some embodiments, the first computing device 201 (C1) may share the first portion 'A1C1' of the first cryptographic key 211 with the second computing device 202 (C2). At step 402, in some embodiments, the second computing device 202 (C2) may share the first portion 'B1C2' of the second cryptographic key 212 with the first computing device 201 (C1).

At step 403, in some embodiments, the first transaction 241 may be signed on the first computer network 21 (A) with data exchange from the first threshold signature address 'A1' to a third address 'A2' when the one or more details of the first transaction 241 are validated by the server 203 (S). At step 404, in some embodiments, the second transaction 242 may be signed on the second computer network 22 'B' with data exchange from the second threshold signature address 'B1' to a fourth address 'B2' when the one or more details of the second transaction are validated by the server 'S'. In some embodiments, validation by the server may include validating that the transaction is carried out by the computing device controlling the corresponding address.

Reference is now made to FIGS. 4B-4E, which show a flowchart of another method of cryptographic key distribution in a plurality of computer networks, according to some embodiments.

At step 411, in some embodiments, the first computing device 201 (C1) may generate a fifth threshold signature address 'A3' on the first computer network 21 (A), wherein a combination of a first portion 'A3C1' of a fifth cryptographic key 311 controlled by the first computing device 201 (C1) with a second portion 'A3C2' of the fifth cryptographic key 311 controlled by the second computing device 202 (C2) and with a third portion 'A3S' of the fifth cryptographic key 311 controlled by the server 203 (S), may correspond to the fifth threshold signature address 'A3'. At step 412, in some embodiments, the second computing device 202 (C2) may generate a sixth threshold signature address 'B3' on the second computer network 22 (B), wherein a combination of a first portion 'B3C2' of a sixth cryptographic key 312 controlled by the second computing device 202 (C2) with a second portion 'B3C1' of the sixth cryptographic key 312 controlled by the first computing device 201 (C1) and with a third portion 'B3S' of the sixth cryptographic key 312 controlled by the server 203 (S), may correspond to the sixth threshold signature address 'B2'.

At step 413, in some embodiments, the third transaction 331 may be signed on the first computer network 21 (A) with data exchange between the first threshold signature address 'A1' and the fifth threshold signature address 'A3' when the one or more details of the third transaction 331 are validated by the server 203 (S). At step 414, in some embodiments, the signing of the third transaction 331 may include signing the third transaction 331, by the first computing device 201 (C1), using the first portion 'A1C1' of the first cryptographic key 211 corresponding to the first threshold signature address 'A1', and/or at step 415, in some embodiments, signing the third transaction 331, by the server 203 (S), using the second portion 'A1S' of the first cryptographic key 211.

At step 416, in some embodiments, the fourth transaction 332 may be signed on the second computer network 22 (B) with data exchange between the second threshold signature address 'B1' and the sixth threshold signature address 'B3' when the one or more details of the fourth transaction 332 are validated by the server 203 (S). The signing 416 of the fourth transaction 332 may include signing 417 the fourth transaction 332, by the second computing device 202 (C2), using the first portion 'B1C2' of the second cryptographic key 212 corresponding to the second threshold signature address 'B1', and/or signing 418 the fourth transaction 332, by the server 203 (S), using the second portion 'B1S' of the second cryptographic key 212.

At step 419, in some embodiments, the first portion 'A3C1' of the fifth cryptographic key 311 may be shared by the first computing device 201 (C1), with the second computing device 202 (C2), when the one or more details of the third transaction are validated by the server 203 (S). At step 420, in some embodiments, the first portion 'B3C2' of the sixth cryptographic key 312 may be shared by the second computing device 202 (C2), with the first computing device 201 (C1), when the one or more details of the fourth transaction are validated by the server 203 (S).

According to some embodiments, any number of computing devices and/or computer networks may similarly apply, where each additional computing devices and/or additional computer networks may add another portion to be shared for each cryptographic key.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of cryptographic key distribution in a plurality of computer networks, wherein the plurality of computer networks is a plurality of blockchain-based computer networks, with a server in communication with the plurality of computer networks, wherein a first computing device controls a first threshold signature address on a first computer network with a first portion of a first cryptographic key in combination, with a second portion of the first cryptographic key controlled by the server, wherein a second computing device controls a second threshold signature address on a second computer network, with a first portion of a second cryptographic key in combination with a second portion of the second cryptographic key, controlled by the server, the method comprising:
   sharing, by the first computing device, the first portion of the first cryptographic key with the second computing device;
   sharing, by the second computing device, the first portion of the second cryptographic key with the first computing device;
   signing a first transaction on the first computer network with data exchange from the first threshold signature address to a third address when one or more details of the first transaction are validated by the server; and
   signing a second transaction on the second computer network with data exchange from the second threshold signature address to a fourth address when one or more details of the second transaction are validated by the server,
   wherein validation by the server comprises validating that the transaction is carried out by the computing device controlling the corresponding address.

2. The method of claim 1, further comprising generating, by the second computing device, the third address on the first computer network, wherein a combination of a first portion of a third cryptographic key controlled by the second computing device with a second portion of the third cryptographic key controlled by the server corresponds to the third address;
   wherein signing the first transaction on the first computer network with data exchange between the first threshold signature address and the third address, comprises:
      signing the first transaction, by the second computing device, using the first portion of the first cryptographic key corresponding to the first threshold signature address; and
      signing the first transaction, by the server, using the second portion of the first cryptographic key.

3. The method of claim 1, further comprising generating, by the first computing device, the fourth address on the second computer network;
   wherein a combination of a first portion of a fourth cryptographic key controlled by the first computing device with a second portion of the fourth cryptographic key controlled by the server corresponds to the fourth address; and wherein signing the second transaction on the second computer network with data exchange between the second threshold signature address and the fourth address, comprises:

signing the second transaction, by the first computing device, using the first portion of the second cryptographic key corresponding to the second threshold signature address; and signing the second transaction, by the server, using the second portion of the second cryptographic key.

4. The method of claim 1, wherein at least one of the third address and the fourth address is a threshold signature address.

5. The method of claim 1, wherein signing the first transaction further comprises:

signing the first transaction, by the second computing device, using the first portion of the first cryptographic key corresponding to the first threshold signature address; and signing the first transaction, by the server, using the second portion of the first cryptographic key.

6. The method of claim 1, wherein signing the second transaction further comprises:

signing the second transaction, by the first computing device, using the first portion of the second cryptographic key corresponding to the second threshold signature address; and signing the second transaction, by the server, using the second portion of the second cryptographic key.

7. The method of claim 1, further comprising:

sharing, by the first computing device, a public key corresponding to the first threshold signature address, with the second computing device and the server; and sharing, by the second computing device, a public key corresponding to the second threshold signature address, with the first computing device and the server.

8. The method of claim 7, further comprising encrypting at least one of the first threshold signature address and the second threshold signature address by the corresponding public key.

9. The method of claim 7, wherein the one or more details of the first transaction are validated by the server with the shared public key corresponding to the first threshold signature address, and wherein the one or more details of the second transaction are validated by the server with the shared public key corresponding to the second threshold signature address.

10. The method of claim 1, further comprising publishing, by the server, the first transaction in the first computer network and the second transaction in the second computer network.

11. The method of claim 1, further comprising:

signing, by the server, the first transaction with at least a portion of the first cryptographic key; and signing, by the server, the second transaction with at least a portion of the second cryptographic key.

12. A method of cryptographic key distribution in a plurality of computer networks, wherein the plurality of computer networks is a plurality of blockchain-based computer networks, with a server in communication with the plurality of computer networks, wherein a first computing device controls a first threshold signature address on a first computer network with a first portion of a first cryptographic key in combination, with a second portion of the first cryptographic key controlled by the server, wherein a second computing device controls a second threshold signature address on a second computer network, with a first portion of a second cryptographic key in combination with a second portion of the second cryptographic key, controlled by the server, the method comprising:

generating, by the first computing device, a fifth threshold signature address on the first computer network, wherein a combination of a first portion of a fifth cryptographic key controlled by the first computing device with a second portion of the fifth cryptographic key controlled by the second computing device and with a third portion of the fifth cryptographic key controlled by the server corresponds to the fifth threshold signature address;

generating, by the second computing device, a sixth threshold signature address on the second computer network, wherein a combination of a first portion of a sixth cryptographic key controlled by the second computing device with a second portion of the sixth cryptographic key controlled by the first computing device and with a third portion of the sixth cryptographic key controlled by the server corresponds to the sixth threshold signature address;

signing a third transaction on the first computer network with data exchange between the first threshold signature address and the fifth threshold signature address when the one or more details of the third transaction are validated by the server, comprising:

signing the third transaction, by the first computing device, using the first portion of the first cryptographic key corresponding to the first threshold signature address; and signing the third transaction, by the server, using the second portion of the first cryptographic key;

signing a fourth transaction on the second computer network with data exchange between the second threshold signature address and the sixth threshold signature address when the one or more details of the fourth transaction are validated by the server, comprising:

signing the fourth transaction, by the second computing device, using the first portion of the second cryptographic key corresponding to the second threshold signature address; and signing the fourth transaction, by the server, using the second portion of the second cryptographic key;

sharing, by the first computing device, the first portion of the fifth cryptographic key with the second computing device, when the one or more details of the third transaction are validated by the server; and sharing, by the second computing device, the first portion of the sixth cryptographic key with the first computing device, when the one or more details of the fourth transaction are validated by the server.

13. The method of claim 12, wherein the at least a portion of a fifth cryptographic key and the at least a portion of a sixth cryptographic key are encrypted in accordance with an incremental cryptographic share exchange protocol configured to decrypt shares of cryptographic keys by multiple parties.

14. The method of claim 12, further comprising:

generating, by the second computing device, at least one seventh threshold signature address on the first computer network that is controlled by the second computing device and the server; and signing a fifth transaction on the first computer network with data exchange between the fifth threshold signature address and the seventh threshold signature address, comprising:
- signing the fifth transaction, by the second computing device, using the first portion of the fifth cryptographic key and the second portion of the fifth cryptographic key, corresponding to the fifth threshold signature address; and
- signing the fifth transaction, by the server, using the third portion of the seventh cryptographic key, when the one or more details of the fifth transaction are validated by the server.

15. The method of claim 12, further comprising:
generating, by the first computing device, at least one eighth threshold signature address on the second computer network that is controlled by the first computing device and the server; and
signing a sixth transaction on the second computer network with data exchange between the sixth threshold signature address and the eighth threshold signature address, comprising:
- signing the sixth transaction, by the first computing device, using the first portion of the sixth cryptographic key and the second portion of the sixth cryptographic key, corresponding to the eighth threshold signature address; and
- signing the sixth transaction, by the server, using the third portion of the sixth cryptographic key, when the one or more details of the sixth transaction are validated by the server.

16. The method of claim 12, further comprising:
- sharing, by the first computing device, a public key corresponding to the fifth threshold signature address, with the second computing device and the server; and
- sharing, by the second computing device, a public key corresponding to the sixth threshold signature address, with the first computing device and the server.

17. The method of claim 16, further comprising encrypting at least one of the fifth threshold signature address and the sixth threshold signature address by the corresponding public key.

18. The method of claim 16, wherein the one or more details of the third transaction are validated by the server with the shared public key corresponding to the fifth threshold signature address, and wherein the one or more details of the fourth transaction are validated by the server with the shared public key corresponding to the sixth threshold signature address.

19. The method of claim 12, further comprising publishing, by the server, the third transaction in the first computer network and the fourth transaction in the second computer network.

20. The method of claim 12, further comprising:
- signing, by the server, the third transaction with at least a portion of the fifth cryptographic key; and
- signing, by the server, the fourth transaction with at least a portion of the sixth cryptographic key.

* * * * *